United States Patent [19]

Zimmerman

[11] Patent Number: 4,642,190
[45] Date of Patent: Feb. 10, 1987

[54] BREWING FUNNEL WITH SCREEN FILTER ASSEMBLY

[75] Inventor: John D. Zimmerman, Springfield, Ill.

[73] Assignee: Bunn-O-Matic Corporation, Springfield, Ill.

[21] Appl. No.: 697,455

[22] Filed: Feb. 1, 1985

[51] Int. Cl.$^4$ .................................... B01D 23/28
[52] U.S. Cl. .................... 210/464; 210/477; 210/479; 210/481; 99/306
[58] Field of Search .......... 210/455, 464, 467, 469, 210/474, 477, 479, 481; 99/306, 323.2, 295, 298, 304, 305

[56] References Cited

U.S. PATENT DOCUMENTS

| | | | |
|---|---|---|---|
| 953,065 | 3/1910 | Smith | 210/455 |
| 1,248,172 | 11/1917 | Schuhmann | 210/467 |
| 1,341,119 | 5/1920 | Fraser | 210/467 |
| 2,472,955 | 6/1949 | Myers | 210/469 |
| 2,689,651 | 9/1954 | Horsdal | 210/455 |
| 3,912,638 | 10/1975 | Beaubien | 210/455 |
| 3,935,112 | 1/1976 | Greutert | 210/469 |
| 4,283,283 | 8/1981 | Zimmerman | 210/455 |
| 4,301,010 | 11/1981 | Eddleman et al. | 210/455 |
| 4,303,525 | 12/1981 | Stover | 210/455 |
| 4,430,222 | 2/1984 | Walker | 210/477 |

Primary Examiner—Richard V. Fisher
Assistant Examiner—Wanda L. Millard
Attorney, Agent, or Firm—Lockwood, Alex, FitzGibbon & Cummings

[57] ABSTRACT

A beverage brewing funnel of the type used with disposable paper filters. The interior bottom surface of the funnel is provided with ribs which prevent the disposable filters when wet from engaging the interior bottom surface. The bottom of the funnel has a radially extending drainage sump with a drainage or discharge port. A three-part removable screen filter assembly is mounted in the drainage port. One part of the filter is a bushing which seats in the drainage port and has exteriorly threaded nipples projecting above and below the drainage port. The bottom end of a enclosed, generally cylindrical and finger-like rigid filter is secured to a nut which is screwed onto the upwardly projecting nipple of the bushing. A separate nut is screwed onto the downwardly projecting nipple and secures the bushing in place in the discharge port.

4 Claims, 4 Drawing Figures

U.S. Patent  Feb. 10, 1987  4,642,190
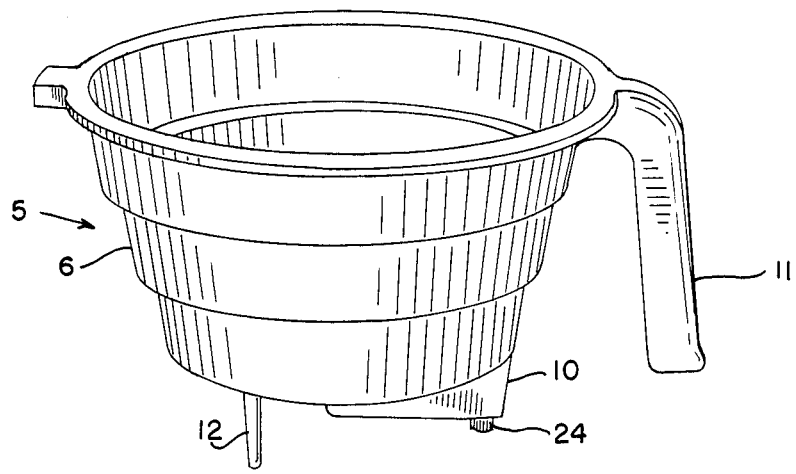
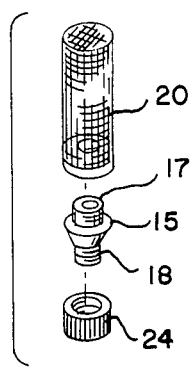
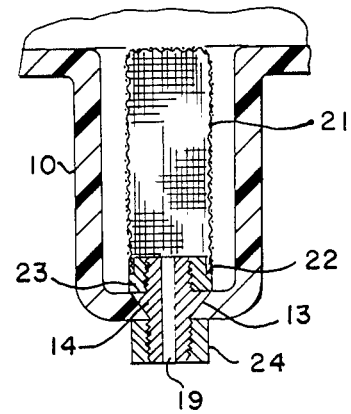
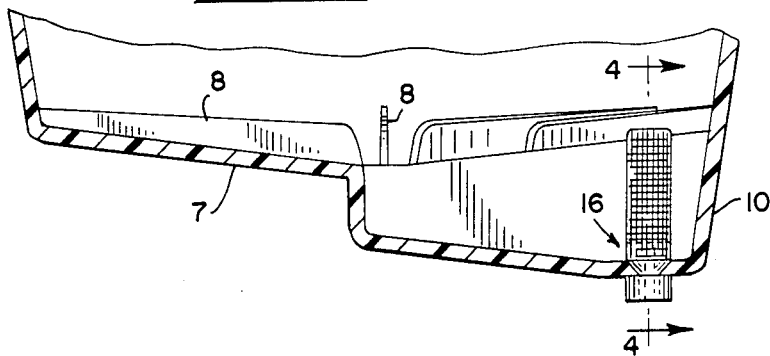

BREWING FUNNEL WITH SCREEN FILTER ASSEMBLY

This invention relates, generally, to innovations and improvements in brewing funnels for beverage making machines, and particularly tea making machines wherein each funnel has a generally radially extending sump in its bottom having a removable screen filter assembly mounted in the drainage port of the sump.

A brewing funnel of the types to which the present invention relates is shown and described in U.S. Pat. No. 4,303,525, issued Dec. 1, 1981. The brewing funnel shown in U.S. Pat. No. 4,303,525 has a radial sump in the bottom having a small outlet opening or port through which the brewed tea or other beverage discharges from the funnel. In the case of a teamaker, the outlet port or opening is relatively small in order to prevent the fast discharge of the contents of the funnel and thereby retain a body of liquid in the funnel sufficiently long to provide the desired brewing action. However, it was found in use that because of the small diameters of the drainage apertures or restricted beverage discharge holes which were appropriate when the funnels were used for brewing tea, they tended to plug with tea dust and fine leaves which succeeded in passing through or by the disposable filters used in the funnels. Accordingly, removable filter screens were provided for the sumps which were secured and placed therein by screws. However, operators had a tendency to loose or misplace the screws and screens when removed for cleaning and the National Sanitation Foundation Agency objected to the use of the screws that were used to secure the screens in place.

The object of the present invention, generally stated, is the provision of brewing funnels which are especially suited for use with tea makers such as shown in U.S. Pat. No. 4,303,525, and which are provided with improved removable screen filters for use in radial sumps of the funnels and which are easily rinsed without removal but which are readily removable for cleaning when required.

More specifically, an important object of the invention is the provision of a beverage brewing funnel for use with tea makers and having a radial sump in the drainage port of which is installed a three-part filter screen assembly in which two of the parts remain more or less permanently in place and a filter screen component in the form of a upstanding generally cylindrical screen filter is readily removable by unscrewing when cleaning of the screen is required.

Certain other objects of the invention will appear from the following description of a preferred embodiment of the invention taken in connection with the accompanying drawings, wherein:

FIG. 1 is a perspective view of a brewing funnel in which a filter screen assembly forming one embodiment of the invention is installed or inserted;

FIG. 2 is a fragmentary detailed sectional view through the bottom of the filter shown in FIG. 1 and showing the filter screen assembly installed in the radial sump of the filter funnel;

FIG. 3 is an exploded perspective view showing the three elements or components of the filter screen assembly that is inserted in the brewing funnel in FIGS. 1 and 2; and FIG. 4 is a fragmentary sectional view taken on line 4—4 of FIG. 2.

In FIG. 1 a beverage brewing funnel is indicated generally at 5 which corresponds generally to the beverage brewing funnel 12 shown in U.S. Pat. No. 4,303,525. The brewing funnel 5 has a generally frusto-conical shape with a stepped sidewall 6 and a dished or concave bottom 7 (FIG. 2). The interior of the bottom 7 is provided with a series of integrally formed upstanding ribs 8 which serve to maintain a space between the bottom of a disposable filter and its contents inserted in the funnel 5 and the bottom of the funnel so as to permit the filter from sealing against or adhering to the bottom surface and thereby facilitate the draining action of brewed beverage from the funnel. The ribs 8 vary in length and are arranged in a pattern such as shown in FIG. 1 of U.S. Pat. No. 4,303,525.

The bottom 7 of the funnel 5 is provided with a radial sump 10, a handle 11 and support feet 12.

The funnel 5 may be injection molded from a suitable plastic material in known manner. However, it will understood that it can also be formed of metal or other materials.

The outer and lowest portion of the sump 10 is provided with a beveled or countersunk port or opening 13 into which is seated a correspondingly tapered or beveled mid-portion 14 of a bushing 15 (FIG. 3) forming one element of a three-part filter screen assembly 16. The bushing 15 has an upper threaded nipple 17 and a lower threaded nipple 18, and has a relatively small bore opening 19 (FIG. 4) extending therethrough.

The second element of the assembly 16 is a filter screen 20 comprised of a generally cylindrical, finger-like screen 21, the bottom end of which is secured by cement or solder 22 to a nut 23 which is interiorly threaded and mates with the upper nipple 17 as shown in FIG. 4. When assembled the bottom face of the nut 23 seats against the annular shoulder on the bushing 15 as shown in FIG. 4.

The third element of the filter screen assembly is a knurled nut 24 which screws onto the lower nipple 18 of the bushing 15. When the nut 24 is tightened against the underside of the sump 10 it draws the mid-portion 14 of the bushing 15 into tight seated relationship in the outlet opening 13 of the sump as shown in FIG. 4.

Stainless steel is a preferred material from which the elements of the filter screen assembly 16 may be formed. However, one or more of the elements may be formed from other metals or materials.

While the entire filter screen assembly 16 may be removed from the sump 10 and readily separated into its three component parts, usually it will suffice to unscrew the filter screen element 20 from the upper nipple 17 and then rinse or wash this screen element leaving the bushing 15 and the nut 24 in place.

What is claimed is:

1. In combination with a beverage brewing funnel having on its bottom a plurality of generally radially extending upstanding internal ribs serving to maintain the bottom of a paper filter seated within said funnel in spaced relation with the inner surface of said funnel bottom and said funnel bottom having a generally radially extending drainage sump with a drainage opening means therein through which brewed and filtered beverage drains from said funnel, a screen filter assembly comprising:

a bushing having an intermediate portion seated in said drainage opening means, having a first externally threaded nipple portion projecting upwardly into said drainage sump and having a second externally threaded nipple portion protruding below said drainage sump;
a first nut screwed onto said first nipple portion;
a generally cylindrical screen filter having a closed upper end with its bottom end secured to said first nut; and
a second nut screwed onto said second nipple portion and drawing said bushing into said seated relationship with said drainage opening means.

2. In the combination called for in claim 1, said drainage opening means having an inverted frusto-conical shape and said intermediate portion of said bushing having a corresponding inverted frusto-conical shape.

3. In the combination called for in claim 1, said intermediate portion of said bushing having an annular upper face against which the annular bottom face of said first nut seats.

4. In the combination called for in claim 1, the upper end of said screen filter being approximately even with the adjacent opposite upper edges of said drainage sump.

* * * * *